US010271021B2

(12) United States Patent
Smolyanskiy et al.

(10) Patent No.: US 10,271,021 B2
(45) Date of Patent: Apr. 23, 2019

(54) VEHICLE TRAJECTORY DETERMINATION TO STABILIZE VEHICLE-CAPTURED VIDEO

(71) Applicant: Microsoft Technology Licensing, LLC, Redmond, WA (US)

(72) Inventors: Nikolai Smolyanskiy, Seattle, WA (US); Zhengyou Zhang, Bellevue, WA (US); Vikram R. Dendi, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 188 days.

(21) Appl. No.: 15/056,678

(22) Filed: Feb. 29, 2016

(65) Prior Publication Data

US 2017/0251179 A1 Aug. 31, 2017

(51) Int. Cl.
*H04N 7/18* (2006.01)
*G02B 27/01* (2006.01)
(Continued)

(52) U.S. Cl.
CPC .......... *H04N 7/185* (2013.01); *B64C 39/024* (2013.01); *G02B 27/017* (2013.01); *G05D 1/101* (2013.01);
(Continued)

(58) Field of Classification Search
CPC ............ B64C 39/024; B64C 2201/141; B64C 2201/146; B64C 2201/123; G05D 1/0011;
(Continued)

(56) References Cited

U.S. PATENT DOCUMENTS 7,130,716 B2 10/2006 Rogers et al.
8,690,750 B2 4/2014 Krueger
(Continued)

FOREIGN PATENT DOCUMENTS

EP 2000777 12/2008
WO WO 2010136586 12/2010
WO WO-2015180133 12/2015

OTHER PUBLICATIONS

"International Search Report and Written Opinion", Application No. PCT/US2017/019229, dated May 12, 2017, 12 pages.
(Continued)

*Primary Examiner* — Obafemi O Sosanya
(74) *Attorney, Agent, or Firm* — Schwegman Lundberg & Woessner, P.A.

(57) ABSTRACT

A vehicle has a camera system that captures video while the vehicle moves. The vehicle records the captured video and/or wirelessly transmits the captured video to a remote user device for playback. When the vehicle is moving, a coarse waypoint is identified and a trajectory is determined from the current location of the vehicle to the coarse waypoint that reduces (e.g., minimizes) sudden changes in direction of movement of the vehicle, reduces (e.g., minimizes) sudden changes in speed of the vehicle, and/or reduces (e.g., minimizes) sudden changes in acceleration of the vehicle by reducing (e.g., minimizing) jerk or snap of the vehicle trajectory. One or more fine waypoints along the trajectory are selected and the vehicle moves to the coarse waypoint along the trajectory by passing through those fine waypoints, resulting in smooth movement of the device that reduces or eliminates motion sickness for users viewing the captured video.

20 Claims, 6 Drawing Sheets

(51) Int. Cl.
    *H04B 7/185*   (2006.01)
    *B64C 39/02*   (2006.01)
    *G05D 1/10*    (2006.01)

(52) U.S. Cl.
    CPC . *H04B 7/18506* (2013.01); *G02B 2027/0178* (2013.01)

(58) Field of Classification Search
    CPC .. G05D 1/0016; G05D 1/0038; G05D 1/0274; G05D 1/042; G05D 1/101
    See application file for complete search history.

(56) References Cited

U.S. PATENT DOCUMENTS

| | | | |
|---|---|---|---|
| 8,755,965 B1* | 6/2014 | McClintic | G05D 1/0016 |
| | | | 701/23 |
| 8,948,935 B1 | 2/2015 | Peeters et al. | |
| 9,459,620 B1* | 10/2016 | Schaffalitzky | G05D 1/0274 |
| 2006/0015247 A1 | 1/2006 | Speer | |
| 2007/0034212 A1 | 2/2007 | Brendley et al. | |
| 2007/0230742 A1* | 10/2007 | Burns | G06T 7/207 |
| | | | 382/103 |
| 2015/0105946 A1 | 4/2015 | Kumar et al. | |
| 2016/0304217 A1* | 10/2016 | Fisher | B60L 11/1809 |

OTHER PUBLICATIONS

Hwang, "Using Zero Moment Point Preview Control Formulation to Generate Nonlinear Trajectories of walking patterns on humanoid robots", In Proceedings of 12th International Conference on Fuzzy Systems and Knowledge Discovery, Aug. 15, 2015, pp. 2405-2411.
Mellinger, "Minimum Snap Trajectory Generation and Control for Quadrotors", In Proceedings of IEEE International Conference on Robotics and Automation, May 9, 2011, pp. 2520-2525.
Nieuwenhuisen, "Motion Planning for Camera Movements", In Proceedings of IEEE International Conference on Robotics and Automation, vol. 4, Apr. 26, 2004, 19 pages.
Richter, "Polynomial Trajectory Planning for Aggressive Quadrotor Flight in Dense Indoor Environments", In Proceedings of the International Symposium of Robotics Research, Dec. 2013, 16 pages.

* cited by examiner

400

500

VEHICLE TRAJECTORY DETERMINATION TO STABILIZE VEHICLE-CAPTURED VIDEO

BACKGROUND

Remote control vehicles have become increasingly popular. This is particularly the case with respect to unmanned aerial vehicles (UAVs), which typically include stabilization technology allowing the UAVs to be flown more easily, especially by novice users. Some of these remote control vehicles also include a camera that allows video to be captured and transmitted back to the user for display on a screen at the user's location, providing a first person view (FPV) to the user of what the vehicle "sees" (e.g., what the user would see if he or she were at the vehicle's location). While the first person view video from these vehicles is beneficial, it is not without its problems. One such problem is that playback of the video can cause motion sickness in some users.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects, a coarse waypoint for a vehicle is identified. A trajectory for the vehicle from a current location of the vehicle to the coarse waypoint is determined, the trajectory reducing sudden changes in direction of movement of the vehicle, reducing sudden changes in speed of the vehicle, and reducing sudden changes in acceleration of the vehicle. One or more fine waypoints along the trajectory are selected, and commands are communicated to a movement control system to maneuver the vehicle from the current location to the coarse waypoint and passing through each of the one or more fine waypoints. Video is captured via a camera system of the vehicle while the vehicle maneuvers from the current location to the coarse waypoint.

In accordance with one or more aspects, a coarse waypoint determination module is configured to identify a coarse waypoint for a vehicle. A trajectory determination module is configured to determine a trajectory for the vehicle from a current location of the vehicle to the coarse waypoint, the trajectory reducing sudden changes in direction of movement of the vehicle, reducing sudden changes in speed of the vehicle, and reducing sudden changes in acceleration of the vehicle. A fine waypoint selection module is configured to select multiple fine waypoints along the trajectory. A movement control module is configured to maneuver the vehicle from the current location to the coarse waypoint by passing through each of the one or more fine waypoints, and a camera system is configured to capture video while the vehicle maneuvers from the current location to the coarse waypoint.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Figure 1:
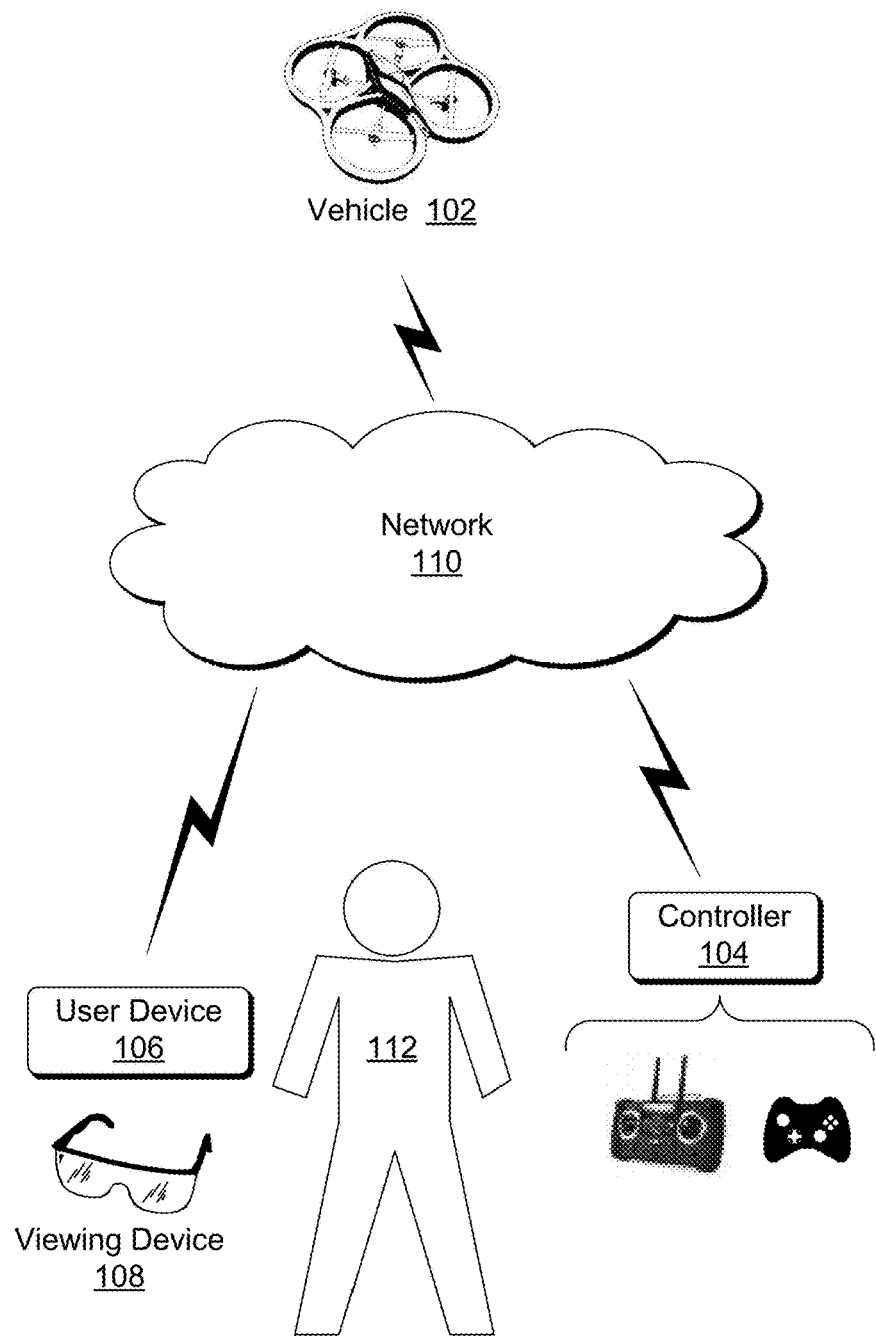
FIG. 1 illustrates an example environment in which the vehicle trajectory determination to stabilize vehicle-captured video can be implemented.

Vehicle trajectory determination to stabilize vehicle-captured video is discussed herein. A vehicle includes, or has attached to it, a camera system that captures video, and thus the vehicle may also be referred to as a camera carrier. A vehicle, as used herein, refers to a vehicle that is controlled by a remote control and/or by pre-programming of the vehicle (e.g., by pre-programming a path to be traveled by the vehicle). Vehicles can include unmanned aerial vehicles (UAVs) or drones, unmanned ground vehicles (e.g., moving along tracks or wheels), unmanned floating and/or submersible vehicles, mobilized computing devices, and so forth. Vehicles can also include humans used as remotely controlled camera carriers, for example by translating control commands into sounds or vibrations to tell a human carrier where to go. The vehicle records the captured video and/or wirelessly transmits the captured video to a remote user device.

The remote user device includes a viewing device for playback of at least part of the captured video. The captured video can be transmitted to the remote user device approximately contemporaneously with its capture by the camera system, and/or at any time after its capture. For example, captured video that has been recorded by the camera system can be recorded and played back at the viewing device hours, days, weeks, etc. later. The viewing device is, for example, virtual reality (VR) glasses or a VR headset, or augmented reality (AR) glasses or an AR headset.

The camera system of the vehicle captures video while the vehicle moves. When the vehicle is moving, a coarse waypoint is identified. The coarse waypoint can have been previously specified (e.g., as part of the pre-programmed path to be traveled by the vehicle) or can be automatically determined as the vehicle is moving (e.g., as the vehicle changes directions in response to a user input from a remote control device). A trajectory for the vehicle from the current location of the vehicle to the coarse waypoint is determined, the trajectory stabilizing the captured video by reducing unwanted camera movements. The trajectory stabilizing the captured video refers to a trajectory that reduces (e.g., minimizes) sudden changes in direction of movement of the vehicle, reduces (e.g., minimizes) sudden changes in speed of the vehicle, and/or reduces (e.g., minimizes) sudden changes in acceleration of the vehicle. One or more finer granularity way points (referred to herein as fine waypoints) on the trajectory are selected, and the vehicle moves to the coarse waypoint along the trajectory by passing through those fine waypoints. This trajectory provides for smooth movement of the device on its way to the coarse waypoint, reducing (or even eliminating) sudden or abrupt movements of the vehicle as it travels to the coarse waypoint.

When capturing video, sudden or abrupt movements of the vehicle, and thus of the camera system, can lead to video that produces motion sickness on the part of the user as they view the captured video. The number of people in which motion sickness occurs and/or the severity of the motion sickness is exacerbated when the viewer is watching the video using AR or VR glasses or a VR or AR headset (in which case the motion sickness can also be referred to as VR sickness), or on a 3-dimensional (3D) screen or display. Using the techniques discussed herein, these sudden or abrupt movements of the vehicle are reduced or even eliminated, thereby reducing or eliminating motion sickness on the part of users viewing the captured video. These sudden or abrupt movements include rotating in place, swinging, sudden altitude change, rapid accelerations and decelerations, and so forth.

FIG. 1 illustrates an example environment 100 in which the vehicle trajectory determination to stabilize vehicle-captured video can be implemented. The environment 100 includes a vehicle 102, a controller 104, a user device 106, a viewing device 108, and a network 110. The network 110 can be any of a variety of different networks, including the Internet, a local area network (LAN), a public telephone network, an intranet, other public and/or proprietary networks, combinations thereof, and so forth. The user device 106 can be any of a variety of different types of computing devices, such as a desktop computer, a server computer, a laptop or netbook computer, a mobile device (e.g., a tablet or phablet device, a cellular or other wireless phone (e.g., a smartphone), a notepad computer, a mobile station), and so forth.

The vehicle 102, although illustrated as a UAV, can be any vehicle that is controlled by a remote control and/or by pre-programming of the vehicle, as indicated above. The environment 100 optionally includes the controller 104, and in situations in which the vehicle 102 is controlled by remote control, the controller 104 is a remote control unit that sends commands wirelessly to the vehicle 102 to control the vehicle 102. In the illustrated example of FIG. 1, a user 112 uses the controller 104 to control the vehicle 102. Different control commands can be provided for different types of vehicles, such as commands indicating which direction to move, commands indicating whether to ascend or descend, commands indicating which speed to move at, and so forth. Additional non-movement based controls can also be provided to the vehicle 102, such as commands indicating to turn on or off a light, commands indicating to begin or stop capturing video, and so forth. In one or more embodiments, the controller 104 sends commands wirelessly to the vehicle 102 via the network 110. Additionally or alternatively, the controller 104 sends commands wirelessly to the vehicle directly rather than via the network 110. Although the controller 104 is illustrated as separate from the user device 106 and the viewing device 108, the controller 104 can alternatively be implemented as part of the user device 106 and/or the viewing device 108.

In one or more embodiments, rather than moving in response to commands received from a remote controller, the vehicle 102 moves according to a pre-programmed path to be traveled by the vehicle or other pre-programmed instructions indicating the path to be traveled by the vehicle. In such situations, the environment 100 need not include the controller 104. The pre-programming of the vehicle 102 can be done in various manners, such as by the user 112, by a designer or seller of the vehicle 102, and so forth. The vehicle 102 can be pre-programmed by interacting directly with the vehicle 102, by communicating with the vehicle 102 via another device (e.g., the user device 106), and so forth.

The vehicle 102 includes a camera system that captures video. The vehicle 102 sends the captured video to the user device 106 and/or records the captured video (e.g., on the vehicle 102 or elsewhere, such as a data store (not shown) coupled to the network 110). The camera system can be incorporated into and thus be part of the vehicle 102, or alternatively can be coupled or attached to the vehicle 102. The video is a set of multiple video frames captured by the camera system at some rate, such as 30 frames per second (fps). The video sent by the camera system to the user device 106 is also referred to as streaming video (or streaming video content, or a video stream), allowing the video content to be received at the user device and displayed on the viewing device 108 as the video content is received rather than waiting for an entire file of video content to be received by the user device 106 prior to playback of the video content.

In one or more embodiments, the camera system of the vehicle 102 sends the video to the user device 106 via the network 110. Additionally or alternatively, the camera system of the vehicle 102 sends the video wirelessly to the vehicle 102 directly rather than via the network 110. The user device 106 is a remote device relative to the vehicle 102, which refers to the user device 106 communicating with the vehicle 102 wirelessly.

The video sent by the camera system of the vehicle 102 is received and processed by the user device 106. This processing includes decoding the video and determining how to display the decoded video to the user 112 via the viewing device 108. This processing of the video can be performed using any of a variety of public and/or proprietary techniques, and can vary based on the desires of the user 112, the desires of the designer or seller of the vehicle 102, and so forth.

In one or more embodiments, the viewing device 108 is virtual reality (VR) glasses or headset, or augmented reality (AR) glasses or headset. Such a viewing device 108 provides the user 112 with a first person view of the video that is captured by the camera system of the vehicle 102. Although illustrated as glasses, the viewing device 108 can alternatively be other types of devices on which video can be displayed. For example, the viewing device 108 can be a 3D display, a curved or flat display screen (e.g., a computer display screen, a laptop screen, a mobile device screen), and so forth.

In one or more embodiments, the viewing device 108 is a stereo device, displaying two different frames (or two different versions of the same frame) for the video concurrently (e.g., one for the left eye of the VR or AR glasses (or headset), and one for the right eye of the VR or AR glasses (or headset)). The stereo video can be generated in various manners, such as by capturing and streaming two different video streams from the vehicle 102, processing the video to generate an appearance of a stereo view from one or more video capture devices, and so forth. Alternatively, the viewing device 108 can be a single display (e.g., mono), or three or more displays.

In the illustrated example, the user device 106 and the viewing device 108 are two different devices. Alternatively, the user device 106 and the viewing device 108 can be implemented as part of the same device. For example, the user device 106 can be implemented as part of the viewing device 108.

In one or more embodiments, the viewing device 108 and/or user device 106 also send commands wirelessly to the camera system of the vehicle 102 to control the camera system of the vehicle 102. These commands can be sent directly to the camera system, or alternatively can be sent to the camera system via the vehicle 102. These commands sent to the camera system are commands to indicate a direction at which video is to be captured (e.g., as a result of the direction at which the user 112 is looking (e.g., an angle or rotation about one or more axes of the head of the user 112)). For example, the user 112 may turn his or her head 90 degrees to the left, indicating to the camera system of the vehicle 102 to capture video at an angle 90 degrees to the left of where it was previously capturing the video (immediately prior to receipt of the command from the viewing device 108). The manner in which the capture of the video at a different angle is performed can vary based on the manner in which the camera system is implemented, and may include rotation or movement of the vehicle 102, may include rotation or movement of the camera system independent of any rotation or movement of the vehicle 102, may include selection of particular video capture devices, and so forth. It should be noted that the commands sent by the viewing device 108 are different from the commands sent by the controller 104 in that the commands sent by the viewing device 108 control which direction video is captured by the vehicle 102 (which may or may not involve movement of the vehicle) whereas the commands sent by the controller 104 control movement of the vehicle 102 (which may or may not involve a change in which direction video is captured by the vehicle 102).

In one or more embodiments, the viewing device 108 sends commands wirelessly to the camera system of the vehicle 102 via the network 110. Additionally or alternatively, the viewing device 108 sends commands wirelessly to the camera system of the vehicle 102 directly rather than via the network 110. Additionally, the viewing device 108 sending commands wirelessly to the camera system can be the viewing device 108 itself sending the commands and/or the user device 106 sending the commands on behalf of the viewing device 108.

The camera system on the vehicle 102 can be implemented in a variety of different manners. In one or more embodiments, the camera system of the vehicle 102 is implemented to have approximately (e.g., within 10% of) a 180 degree field of view. This can be accomplished using a single video capture device or alternatively multiple video capture devices configured in various different arrangements. Each video capture device includes an image sensor capable of sensing an image, and can be implemented using any of a variety of different technologies such as charge-coupled devices (CCDs), complementary metal-oxide-semiconductors (CMOS), N-type metal-oxide-semiconductors (NMOS), and so forth. Alternatively, the camera system of the vehicle 102 is implemented to have a different (e.g., larger) field of view, although the field of view of the camera system is less than the field of view provided by the viewing device 108.

Figure 2:
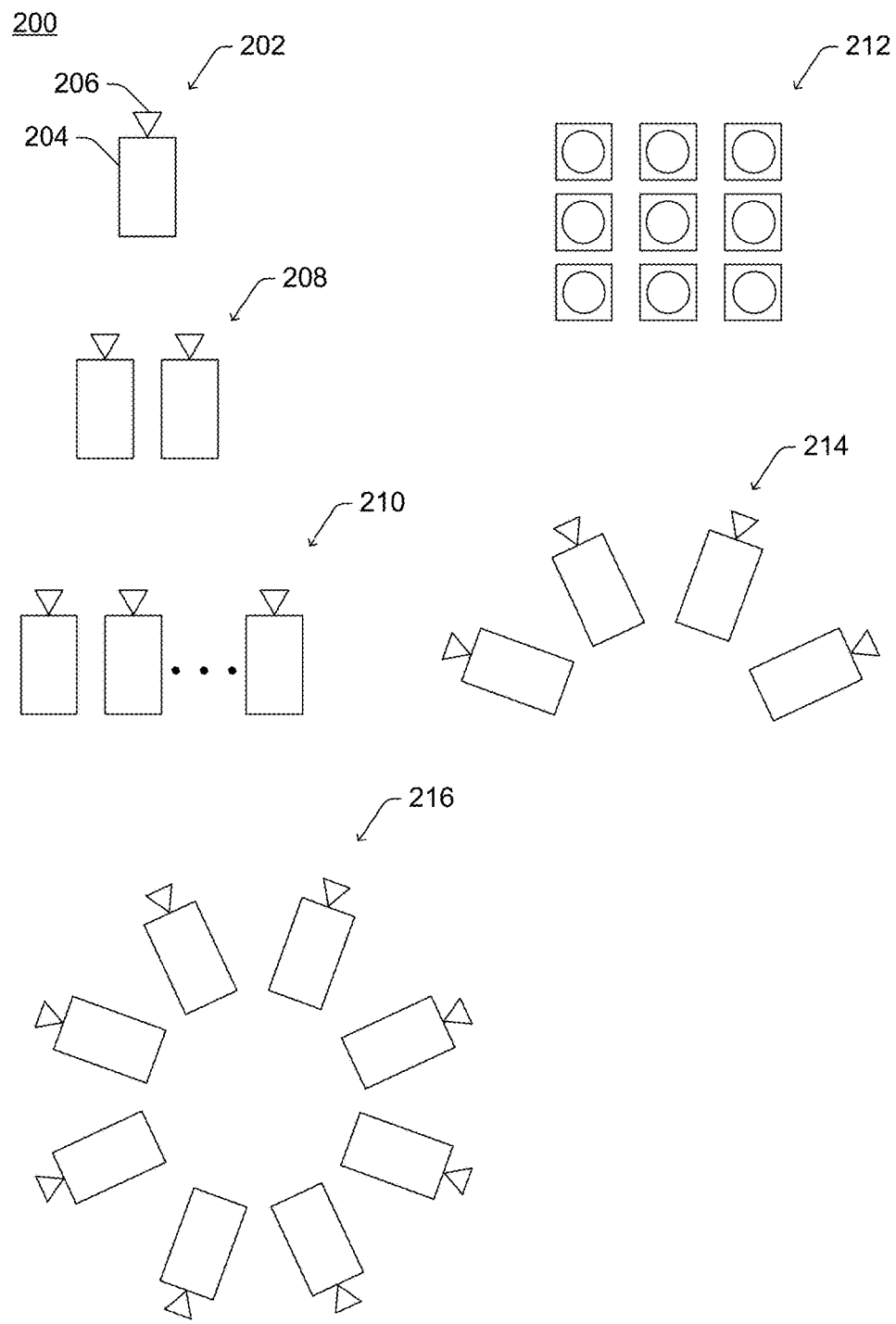
FIG. 2 illustrates several example arrangements of video capture devices for a camera system in accordance with one or more embodiments.

FIG. 2 illustrates several example arrangements of video capture devices for a camera system 200. The camera system 200 can be included as part of, or attached to, the vehicle 102 of FIG. 1. The camera system 200 can be a single video capture device 202 having an image sensor 204 and a lens 206. Alternatively, the camera system 200 can be two video capture devices 202 with approximately parallel (e.g., within 3-5 degrees of being parallel) lines of sight, such as shown in arrangement 208. Alternatively, the camera system 200 can be three or more video capture devices 202 with approximately parallel (e.g., within 3-5 degrees of being parallel) lines of sight, such as shown in arrangement 210.

Alternatively, the camera system 200 can be three or more video capture devices 202 arranged in a grid with approximately parallel (e.g., within 3-5 degrees of being parallel) lines of sight. A front view of such a camera system is shown in arrangement 212. Alternatively, the camera system 200 can be multiple (e.g., four) video capture devices 202 arranged in a semi-circle, such as shown in arrangement 214. Alternatively, the camera system 200 can be multiple (e.g., eight) video capture devices 202 arranged in a circle, such as shown in arrangement 216.

Although example arrangements of video capture devices are illustrated in FIG. 2, it should be noted that any of a variety of different arrangements of video capture devices can be used. For example, video capture devices could be arranged in a hemisphere, a sphere, and so forth.

Figure 3:
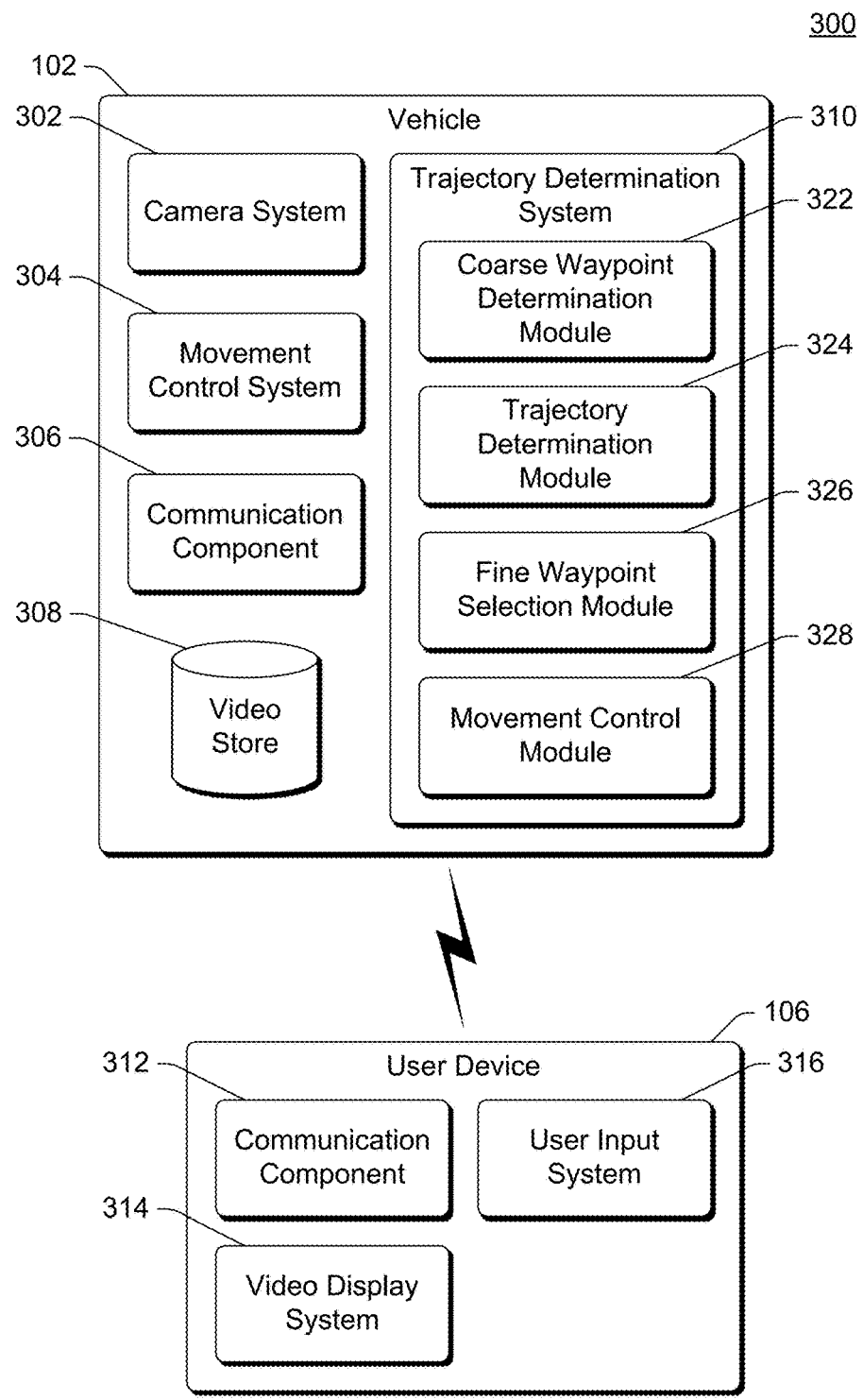
FIG. 3 illustrates an example system implementing the techniques discussed herein in additional detail.

FIG. 3 illustrates an example system 300 implementing the techniques discussed herein in additional detail. The system 300 includes a vehicle 102 and a user device 106. The vehicle 102 includes a camera system 302, a movement control system 304, a communication component 306, a video store 308, and a trajectory determination system 310. The camera system 302 includes one or more video capture devices, such as one or more video capture devices 202 in any of the arrangements discussed above with respect to FIG. 2. The camera system 302 also includes additional software, firmware, and/or hardware to facilitate capturing frames of video and providing the captured frames to the communication component 306 and/or the video store 308.

The movement control system 304 includes various software, firmware, and/or hardware to manage movement of the vehicle 102, such as various motors, servos, and so forth. In one or more embodiments, movement commands for the vehicle 102 are received from the user device 106 via the communication component 306, and movement control system 304 carries out those commands. Additionally or alternatively, movement commands can be received from another component or module of the vehicle 102, such as memory or other storage device of the vehicle 102 in which pre-programmed path is stored. The movement commands received from the communication component 306 (or other component or module) can be modified or changed by the trajectory determination system 310 to reduce sudden changes in direction of movement of the vehicle 102, reduce sudden changes in speed of the vehicle 102, and/or reduce sudden changes in acceleration of the vehicle 102 as discussed in more detail below.

The manner in which the commands are carried out by the movement control system 304 varies based on the particular commands. For example, the commands can be carried out by increasing or decreasing the speed of particular motors (e.g., that turn propellers), activating or deactivating particular servos, and so forth.

The communication component 306 manages communication with the user device 106. In one or more embodiments, the communication component 306 receives movement commands from the controller 104 of FIG. 1 and provides those movement commands to the movement control system 304. Additionally or alternatively, the communication component 306 receives commands directed to the camera system 302 and provides those commands to the camera system 302. The commands directed to the camera system 302 can be received from the user device 106 or the viewing device 108 of FIG. 1 as discussed above.

In one or more embodiments, the communication component 306 also receives frames of video from the camera system 302 and transmits the frames of video to the user device 106. The communication component 306 (and/or camera system 302) can optionally perform various processing on the video prior to transmitting the video to the user device, such as encoding the video using any of a variety of public and/or proprietary protocols (e.g., the H.264 protocol as discussed in the ITU-T H.264 Recommendation (February 2014), the H.265 protocol as discussed in the ITU-T H.265 Recommendation (April 2015), the VP9 video coding format available from The WebM Project at www.webm-project.org), encrypting the video using any of a variety of public and/or proprietary protocols (e.g., using symmetric key cryptography, using public key cryptography), and so forth.

The user device 106 includes a communication component 312, a video display system 314, and optionally a user input system 316. The communication component 312 receives video from the communication component 306 of the vehicle 102. The communication component 312 optionally performs various processing on the video, depending on what processing (if any) was performed prior to the communication component 306 transmitting the video. For example, the communication component 312 can decode the video using any of a variety of public and/or proprietary protocols, decrypt the video using any of a variety of public and/or proprietary protocols, and so forth. The communication component 312 provides the processed (e.g., decoded and/or decrypted) video to the video display system 314.

In situations in which commands are sent to the camera system 302 by the user device, those commands are sent via the communication component 312.

The video display system 314 generates one or more frames for display by the viewing device 108 and/or provides data to the viewing device 108 allowing the viewing device 108 to generate the frames for display. In one or more embodiments, the video display system 314 generates and/or provides data for the viewing device 108 to display a pair of video frames concurrently. The pair of video frames correspond to a frame (or pair of frames) captured by the camera system 302 and provide a stereo effect when displayed by the viewing device. This allows, for example, the user 112 to have a first person view of the video captured by the camera system 302, such as by using VR or AR glasses (or headset).

The user input system 316 receives user input to control the vehicle 102. These inputs can take various forms, such as movement of a stick or pressing of a button, making a gesture or touching a location on a touchscreen (optionally the same screen on which the video captured by the camera system 302 is displayed), voice commands, and so forth.

Additionally or alternatively, the communication component 306 can transmit the captured video to another device other than the user device 106, such as a storage device coupled to the network 110 of FIG. 1. The camera system 302 also optionally stores the captured video in the video store 308, in addition to or alternatively in place of the communication component 306 transmitting the captured video to the user device 106 or some other device. Once stored in the video store 308, the captured video can be subsequently transferred to one or more other devices (such as user device 106) for playback. Thus, the video captured by the camera system 302 can be played back approximately contemporaneously with its capture (although there may be some time delay (e.g., less than one or two seconds) due to the processing (e.g., encoding, encrypting, decoding, decrypting, etc.) and transmission via wireless communications) and/or at some later time (e.g., hours, days, weeks, etc. after the video is captured).

The trajectory determination system 310 determines a trajectory for the vehicle 102 that reduces (e.g., minimizes) sudden changes in direction of movement of the vehicle 102, reduces (e.g., minimizes) sudden changes in speed of the vehicle 102, and/or reduces (e.g., minimizes) sudden changes in acceleration of the vehicle 102. The trajectory determination system 310 communicates commands to the movement control system 304 that cause the movement control system 304 to maneuver the vehicle 102 along the trajectory. This results in movement of the vehicle 102, and thus video captured by the camera system 302 that is stabilized—sudden changes in direction of movement of the vehicle 102 are reduced (e.g., minimized), sudden changes in speed of the vehicle 102 reduced (e.g., minimized), and/or sudden changes in acceleration of the vehicle 102 reduced (e.g., minimized).

The trajectory determination system 310 includes a coarse waypoint determination module 322, a trajectory determination module 324, a fine waypoint selection module 326, and a movement control module 328. Generally, the trajectory determination system 310 identifies a trajectory for the vehicle between a current location of the vehicle 102 and a coarse waypoint for the vehicle 102. The coarse waypoint refers to a physical location to which the vehicle 102 is to travel. A trajectory that reduces (e.g., minimizes) sudden changes in direction of movement of the vehicle 102, reduces (e.g., minimizes) sudden changes in speed of the vehicle 102, and/or reduces (e.g., minimizes) sudden changes in acceleration of the vehicle 102 is determined and multiple physical locations along that trajectory are selected. These multiple physical locations along the trajectory are referred to as fine waypoints. Commands are provided to the movement control system 304 to move the vehicle from fine waypoint to fine waypoint along the trajectory.

The coarse waypoint determination module 322 identifies or determines the coarse waypoint, and can do so in any of a variety of different manners. In one or more embodiments, such as embodiments in which the path the vehicle 102 is to take is pre-programmed in the vehicle 102, the coarse waypoint is also pre-programmed in the vehicle 102. The coarse waypoint can be pre-programmed into the vehicle 102 by any of a variety of different users or other individuals, such as the user or entity that pre-programmed the vehicle 102 with the path. In such embodiments, the coarse waypoint determination module 322 determines the coarse waypoint by retrieving or otherwise obtaining the pre-programmed coarse waypoint.

The coarse waypoint can also be identified in various other manners. For example, a user input to the user device 106 or viewing device 108 can specify a change in direction for the vehicle 102 (e.g., a user input to have the vehicle 102 fly to the right). In response to such a user input, the coarse waypoint determination module 322 identifies a physical location that corresponds to the user input (e.g., the amount of movement to the right), and determines that a coarse waypoint exists at that determined physical location. In one or more embodiments, the physical location is associated with some physical distance away from vehicle 102 (e.g., a particular number of feet ahead and at an angle to the right that corresponds to the amount of movement to the right specified by the user input). The physical distance can be a set physical distance (e.g., 100 feet) or a variable distance (e.g., a number of feet that the vehicle 102 is expected to move over some amount of time, such as 30 seconds, at the current velocity of the vehicle 102).

The coarse waypoint can additionally or alternatively be determined based on other user inputs. In one or more embodiments, a user input to a touchscreen of the user device 106 or viewing device 108 can specify a particular physical location. For example, the video captured by the camera system 302 can be displayed on a touchscreen and the user can touch a location of the touchscreen to specify where he or she desires the vehicle 102 to move to. E.g., the user can touch a tree that is displayed, in response to which the coarse waypoint determination module 322 identifies the tree in the display and determines that a coarse waypoint exists at that tree (or a threshold distance away from the tree so that the coarse waypoint is near the tree but the vehicle 102 does not hit the tree).

The trajectory determination module 324 generates the trajectory between a current location of the vehicle 102 and the coarse waypoint determined by the coarse waypoint determination module 322. The trajectory generated by the trajectory determination module 324 reduces (e.g., minimizes) sudden changes in direction of movement of the vehicle 102, reduces (e.g., minimizes) sudden changes in speed of the vehicle 102, and/or reduces (e.g., minimizes) sudden changes in acceleration of the vehicle 102. In one or more embodiments, the trajectory determination module 324 determines the trajectory by analyzing a set of calculations that specify the velocity of the vehicle 102 (the speed and direction that the vehicle 102 is moving), the acceleration of the vehicle 102, and the change in direction of the vehicle 102. The analysis includes calculating a polynomial that represents the trajectory so that changes in velocity of the vehicle 102 are reduced (e.g., minimized), changes in acceleration of the vehicle 102 are reduced (e.g., minimized), and changes in direction of movement of the vehicle 102 are reduced (e.g., minimized). The vehicle trajectory is computed, and by reducing (e.g., minimizing) snap or jerk quantities of the vehicle trajectory, sudden changes in the trajectory shape, velocity and acceleration are reduced (e.g., minimized).

The trajectory determination module 324 generates a polynomial x(t) that represents the trajectory for the vehicle 102 between the current location of the vehicle 102 and the coarse waypoint for the vehicle 102. In one or more embodiments, the trajectory for the vehicle 102 is in 3-dimensional (3D) space, although alternatively for some vehicles the trajectory may be in 2-dimensional (2D) space. The polynomial x(t) is defined as:

$$x(t)=a_0 a_1 t+a_2 t^2+a_3 t^3+a_4 t^4+a_5 t^5$$

where t refers to time ranging from a time $t_1$ that is the time that the vehicle 102 is at the current location and a time $t_2$ that is the time that the vehicle 102 is at the coarse waypoint. The coefficients $a_0$, $a_1$, $a_2$, $a_3$, $a_4$, $a_5$ are calculated based on various additional equations so that changes in velocity along the trajectory represented by the polynomial x(t) are reduced (e.g., minimized), changes in acceleration along the trajectory represented by the polynomial x(t) are reduced (e.g., minimized), and changes in direction of movement along the trajectory represented by the polynomial x(t) are reduced (e.g., minimized).

Figure 4:
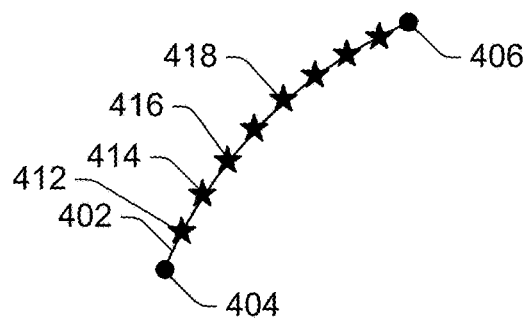
FIG. 4 illustrates an example trajectory in accordance with one or more embodiments.

FIG. 4 illustrates an example trajectory in accordance with one or more embodiments. For ease of explanation, the discussion of the trajectory determination module 324 determining the trajectory is made with reference to the example 400 of FIG. 4. An example trajectory 402 is illustrated as a curved line between a current location 404 and a coarse waypoint 406. The polynomial x(t) represents the trajectory 402 in the example of FIG. 4.

The trajectory determination module 324 also uses the following equations:

$$x_1(t)=a_0+a_1 t_1+a_2 t_1^2+a_3 t_1^3+a_4 t_1^4+a_5 t_1^5$$

$$x_2(t)=a_0+a_1 t_2+a_2 t_2^2+a_3 t_2^3+a_4 t_2^4+a_5 t_2^5$$

where $x_1(t)$ refers to the physical location of the current location of the vehicle 102, $x_2(t)$ refers to the physical location of the coarse waypoint, $t_1$ refers to the time that the vehicle 102 is at location $x_1(t)$, and time $t_2$ refers to the time that the vehicle 102 is at the location $x_2(t)$.

The velocity of the vehicle 102 is calculated as the first derivative of the polynomial x(t) with regard to time. Therefore, the velocity of the vehicle 102 at time $t_1$ is calculated as the first derivative of the trajectory with regard to time evaluated at time $t_1$:

$$v_1=\dot{x}(t_1)$$

Similarly, the velocity of the vehicle 102 at time $t_2$ is calculated as the first derivative of the trajectory with regard to time evaluated at time $t_2$:

$$v_2=\dot{x}(t_2)$$

The acceleration of the vehicle 102 is calculated as the second derivative of the polynomial x(t) with regard to time. The trajectory determination module 324 is reducing (e.g., minimizing) the acceleration of the trajectory, and the trajectory determination module 324 thus uses a value of zero for the acceleration of the vehicle 102 at time $t_1$ as well as at time $t_2$. Therefore, the following equation, setting the second derivative of the trajectory with regard to time evaluated at time $t_1$ equal to zero, can be used by the trajectory determination module 324 indicating that the acceleration of the vehicle 102 at time $t_1$ is zero:

$$0=\ddot{x}(t_1)$$

Similarly, the following equation, setting the second derivative of the trajectory with regard to time evaluated at time $t_2$ equal to zero, can be used by the trajectory determination module 324 indicating that the acceleration of the vehicle 102 at time $t_2$ is zero:

$$0=\ddot{x}(t_2)$$

Thus, the trajectory determination module 324 has the following six equations:

$$x_1(t)=a_0+a_1 t_1+a_2 t_1^2+a_3 t_1^3+a_4 t_1^4+a_5 t_1^5$$

$$x_2(t)=a_0+a_1 t_2+a_2 t_2^2+a_3 t_2^3+a_4 t_2^4+a_5 t_2^5$$

$$v_1=\dot{x}(t_1)$$

$$v_2=\dot{x}(t_2)$$

$$0=\ddot{x}(t_1)$$

$$0=\ddot{x}(t_2)$$

Given these six equations, the trajectory determination module 324 can readily solve for the six coefficients $a_0$, $a_1$, $a_2$, $a_3$, $a_4$, $a_5$.

In one or more embodiments, the trajectory determination module 324 solves for the six coefficients $a_0$, $a_1$, $a_2$, $a_3$, $a_4$, $a_5$ so that movement of the vehicle 102 represented by "jerk"

is reduced or minimized. Jerk refers to a sudden or sharp movement, so reducing or minimizing jerk reduces or minimizes sudden changes in direction of movement of the vehicle 102. The jerk of the vehicle 102 is calculated as the third derivative of the polynomial x(t) with regard to time. Therefore, the jerk of the vehicle 102 is calculated as:

$$\text{jerk} = \dddot{x}(t) = \frac{d^3 x(t)}{dt^3}$$

The trajectory having minimized jerk is the trajectory represented by the polynomial x(t) that minimizes the following metric:

$$\int_{t_1}^{t_2} \|\dddot{x}(t)\|_2^2 dt$$

Any of a variety of different public and/or proprietary mathematical optimization techniques can be used to determine the six coefficients $a_0, a_1, a_2, a_3, a_4, a_5$ for the trajectory represented by the polynomial x(t) that minimize this metric given the six equations discussed above. Examples of such mathematical optimization techniques include least squares fitting, Lagrange optimization, and so forth.

In one or more embodiments, the trajectory determination module 324 solves for the coefficients for the trajectory so that movement of the vehicle 102 represented by "snap" is reduced or minimized. Snap refers to a sudden rapid change in direction of movement of the vehicle 102, which includes sudden or sharp movements and also more rapid changes in direction (e.g., a sharp boomerang or 180-degree change in direction). Reducing (e.g., minimizing) snap typically provides a smoother trajectory than reducing (e.g., minimizing) jerk. Thus, reducing or minimizing snap reduces or minimizes sudden changes in direction of movement of the vehicle 102. The snap of the vehicle 102 is calculated as the fourth derivative of the polynomial x(t) with regard to time. Therefore, the snap of the vehicle 102 is calculated as:

$$\text{snap} = \ddddot{x}(t) = \frac{d^4 x(t)}{dt^4}$$

The trajectory having minimized snap is the trajectory represented by the polynomial x(t) that minimizes the following metric:

$$\int_{t_1}^{t_2} \|\ddddot{x}(t)\|_2^2 dt$$

To minimize jerk in the trajectory, a $5^{th}$ degree polynomial is used as discussed above. To minimize snap in the trajectory, a $7^{th}$ degree polynomial x'(t) is used, and is defined as:

$$x'(t) = a_0 + a_1 t + a_2 t^2 + a_3 t^3 + a_4 t^4 + a_5 t^5 + a_6 t^6 + a_7 t^7$$

where t refers to time ranging from a time $t_1$ that is the time that the vehicle 102 is at the current location and a time $t_2$ that is the time that the vehicle 102 is at the coarse waypoint. The coefficients $a_0, a_1, a_2, a_3, a_4, a_5, a_6, a_7$ are calculated based on various additional equations so that changes in velocity along the trajectory represented by the polynomial x'(t) are reduced (e.g., minimized), changes in acceleration along the trajectory represented by the polynomial x'(t) are reduced (e.g., minimized), and changes in direction of movement along the trajectory represented by the polynomial x'(t) are reduced (e.g., minimized). The polynomial x'(t) represents the trajectory of the vehicle 102, and is used analogously to the polynomial x(t) discussed herein, except that the polynomial x'(t) is used when reducing (e.g., minimizing) snap whereas the polynomial x(t) is used when reducing (e.g., minimizing) jerk.

The jerk of the vehicle 102 is calculated as the third derivative of the polynomial x'(t) with regard to time as discussed above. The trajectory determination module 324 is reducing (e.g., minimizing) the jerk of the trajectory, and the trajectory determination module 324 thus uses a value of zero for the jerk of the vehicle 102 at time $t_1$ as well as at time $t_2$. Therefore, the following equation, setting the third derivative of the trajectory with regard to time evaluated at time $t_1$ equal to zero, can be used by the trajectory determination module 324 indicating that the jerk of the vehicle 102 at time $t_1$ is zero:

$$0 = \dddot{x'}(t_1)$$

Similarly, the following equation, setting the third derivative of the trajectory with regard to time evaluated at time $t_2$ equal to zero, can be used by the trajectory determination module 324 indicating that the jerk of the vehicle 102 at time $t_2$ is zero:

$$0 = \dddot{x'}(t_2)$$

Thus, when reducing (e.g., minimizing) snap, the trajectory determination module 324 has the following eight equations:

$$x_1'(t) = a_0 + a_1 t_1 + a_2 t_1^2 + a_3 t_1^3 + a_4 t_1^4 + a_5 t_1^5 + a_6 t_1^6 + a_7 t_1^7$$

$$x_2(t) = a_0 + a_1 t_2 + a_2 t_2^2 + a_3 t_2^3 + a_4 t_2^4 + a_5 t_2^5 + a_6 t_2^6 + a_7 t_2^7$$

$$v_1 = \dot{x'}(t_1)$$

$$v_2 = \dot{x'}(t_2)$$

$$0 = \ddot{x'}(t_1)$$

$$0 = \ddot{x'}(t_2)$$

$$0 = \dddot{x'}(t_1)$$

$$0 = \dddot{x'}(t_2)$$

Given these eight equations, the trajectory determination module 324 can readily solve for the eight coefficients $a_0, a_1, a_2, a_3, a_4, a_5, a_6, a_7$. Any of a variety of different public and/or proprietary mathematical optimization techniques can be used to determine the eight coefficients $a_0, a_1, a_2, a_3, a_4, a_5, a_6, a_7$ for the trajectory represented by the polynomial x'(t) that minimize the metric given above. Examples of such mathematical optimization techniques include least squares fitting, Lagrange optimization, and so forth.

The fine waypoint selection module 326 selects one or more fine waypoints along the trajectory. The fine waypoints represent different physical locations along the trajectory from the current location to the coarse waypoint, and can be situated at regular or irregular intervals along the trajectory. In the example 400 of FIG. 4, the fine waypoints are illustrated as stars along the trajectory 402. Thus, for example, the fine waypoints between the current location 404 and the coarse waypoint 406 includes fine waypoints 412, 414, 416, 418, and so forth.

The fine waypoint selection module 326 can select the fine waypoints in any of a variety of different manners. In one or more embodiments, the fine waypoints are selected at timed intervals, such as approximately (within a threshold amount of) every 5 seconds, every 10 seconds, etc. along the trajectory is a fine waypoint. For example, in the example 400, if the vehicle 102 is at the current location 404 at time $t_1$, then one fine waypoint can be at time $t_1 + 5$ seconds, another fine waypoint can be at $t_1+10$ seconds, another fine waypoint can be at $t_1+15$ seconds, and so forth.

Additionally or alternatively, the fine waypoints are selected at distance intervals, such as approximately (within a threshold amount of) every 3 feet, every 10 feet, and so forth. The distance that the vehicle 102 moves along the trajectory depends on the velocity of the vehicle 102, and thus the locations of the fine waypoints along the trajectory can be readily identified based on the velocity of the vehicle 102.

The movement control module 328 issues commands to the movement control system 304 to have the vehicle 102 move from fine waypoint to fine waypoint. This movement can include activation or deactivation of various motors, servos, etc., changes in speed of operation of various motors (e.g., increases or decreases in revolutions per minute (RPM) of a motor), servos, etc., and so forth. For example, given that the trajectory 402 and assuming the vehicle 102 is at the current location 404, the movement control module 328 issues commands to the movement control system to first maneuver the vehicle 102 to the physical location corresponding to fine waypoint 412, then to maneuver the vehicle 102 to the physical location corresponding to fine waypoint 414, then to maneuver the vehicle 102 to the physical location corresponding to fine waypoint 416, and so forth. Thus, the vehicle 102 passes through the fine waypoints as the vehicle 102 travels to the coarse waypoint 406.

Rather than issuing commands to the movement control system 304 to have the vehicle move from fine waypoint to fine waypoint, the movement control module 328 can directly control various hardware such as motors, servos, and so forth. For example, speeds of each of one or more wheels, speeds of each of one or more rotors, and so forth can be computed based on the fine waypoints. Given these computed speeds, the movement control module 328 provides control signals to various motors, servos, etc. (e.g., wheel motors, rotor motors, etc.) to control the movement of the vehicle 102 along the trajectory from fine waypoint to fine waypoint.

It should be noted that the vehicle 102 can move along a path having multiple different coarse waypoints. This can be a result of multiple different coarse waypoints having been pre-programmed into the vehicle 102 and/or other inputs. For example, each time a user input is received that changes the direction of movement of the vehicle 102 (e.g., a user input indicating to move up, or further to the right, etc.), the trajectory determination system 310 determines a new coarse waypoint and a new trajectory having new fine waypoints.

Figure 5:
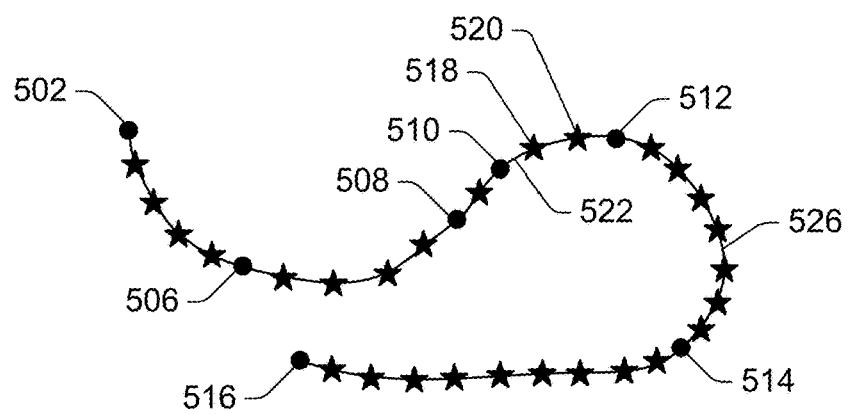
FIG. 5 illustrates additional example trajectories in accordance with one or more embodiments.

FIG. 5 illustrates additional example trajectories in accordance with one or more embodiments. In the example 500 of FIG. 5, a path traveling from a current location 502 to a final destination 504 is illustrated. Coarse waypoints 506, 508, 510, 512, 514, and 516 along the path are illustrated by circles, with trajectories between the coarse waypoints illustrated as lines between the coarse waypoints. Fine waypoints are illustrated between the coarse waypoints as stars. For example, fine waypoints 518 and 520 are illustrated along the trajectory 522 between coarse waypoints 510 and 512.

In one or more embodiments, in situations in which the path includes multiple different coarse waypoints, each trajectory between two coarse waypoints is constrained to be a smooth continuation of the previous trajectory. For example, the trajectory 526 between coarse waypoints 512 and 514 is constrained to be a smooth continuation of the trajectory 522 between coarse waypoints 510 and 512. This constraining of the trajectory to be a smooth continuation of the previous trajectory can be accomplished in a variety of different manners. In one or more embodiments, the trajectory determination module 324, when determining the trajectory, automatically constrains the trajectory to be a smooth continuation of the previous trajectory due to the trajectory determination module 324 reducing (e.g., minimizing) jerk or snap and using the velocities of the vehicle 102 at the coarse waypoints. Thus, for example, the trajectory 526 is a curved line from the coarse waypoint 512 to the coarse waypoint 514, which reduces jerk or snap relative to a trajectory that would be a straight line from the coarse waypoint 512 to the coarse waypoint 514 (and which would result in a sharp, abrupt turn by the vehicle at the coarse waypoint 512).

In one or more embodiments, the trajectory determination module 324 determines the trajectory for the vehicle 102 by reducing (e.g., minimizing) jerk and/or snap. As snap uses on fourth derivative computations whereas jerk uses third derivative computations, the computational resources (e.g., processing power, memory, etc.) taken to reduce jerk can be less than taken to reduce snap. Thus, for example, if the trajectory determination system 310 is implemented in a vehicle 102 with lower computation resources (e.g., slower processor and/or less memory) then the trajectory determination module 324 determines the trajectory for the vehicle 102 by reducing (e.g., minimizing) jerk. However, if the trajectory determination system 310 is implemented in a vehicle 102 with higher computation resources (e.g., faster processor and/or more memory) then the trajectory determination module 324 determines the trajectory for the vehicle 102 by reducing (e.g., minimizing) snap.

Figure 6:
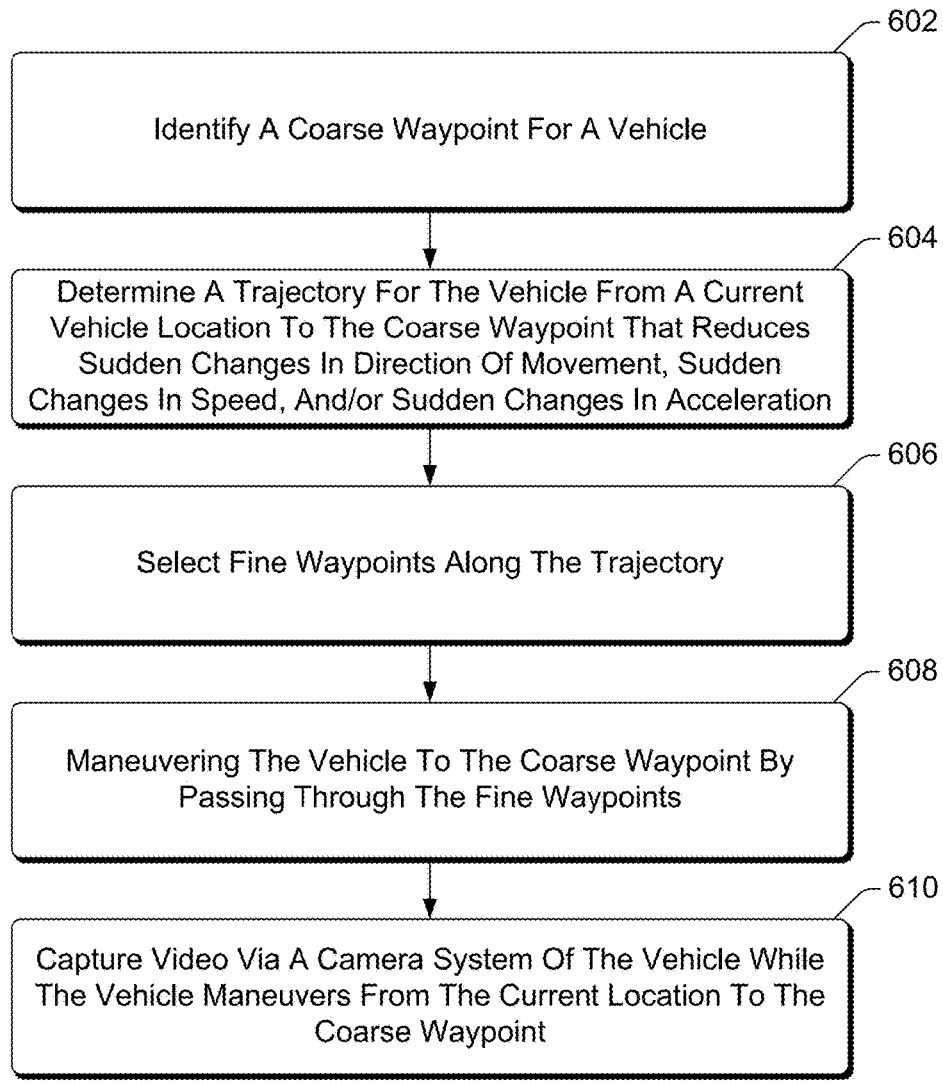
FIG. 6 is a flowchart illustrating an example process for vehicle trajectory determination to stabilize vehicle-captured video in accordance with one or more embodiments.

FIG. 6 is a flowchart illustrating an example process 600 for vehicle trajectory determination to stabilize vehicle-captured video in accordance with one or more embodiments. Process 600 is carried out by a vehicle, such as vehicle 102 of FIG. 1 or FIG. 3, and can be implemented in software, firmware, hardware, or combinations thereof. Process 600 is shown as a set of acts and is not limited to the order shown for performing the operations of the various acts. Process 600 is an example process for vehicle trajectory determination to stabilize vehicle-captured video; additional discussions of vehicle trajectory determination to stabilize vehicle-captured video are included herein with reference to different figures.

In process 600, a coarse waypoint for a vehicle is identified (act 602). The coarse waypoint can be identified or determined in any of a variety of different manners as discussed above, such as based on user input, based on a pre-programmed path or coarse waypoints, and so forth.

A trajectory for the vehicle from a current location of the vehicle to the coarse waypoint identified in act 602 is determined (act 604). The trajectory reduces sudden changes in direction of movement, sudden changes in speed, and/or sudden changes in acceleration as discussed above. In one or more embodiments, the trajectory is determined in act 604 to reduce (e.g., minimize) jerk or snap in the trajectory as discussed above.

One or more fine waypoints along the trajectory are selected (act 606). These fine waypoints can be selected based on time elapsed while the vehicle maneuvers along the trajectory to the coarse waypoint, distance moved by the vehicle along the trajectory, and so forth as discussed above. This results in a very smooth rail-like trajectory that reduces (e.g., minimizes) acceleration and also avoids swinging movements as well as sharp turns and rotations left to right that may cause motion sickness for the viewer of the captured video.

The vehicle is maneuvered to the coarse waypoint by passing through the fine waypoints (act 608). This maneuvering can be performed in various manners, such as communicating commands to a movement control system of the vehicle to maneuver the vehicle to the coarse waypoint and passing through the fine waypoints, by providing control signals to motors or other hardware of the vehicle to maneuver the vehicle to the coarse waypoint and passing through the fine waypoints, and so forth. By passing the through the fine waypoints, the vehicle remains on the trajectory, keeping a smooth movement of the vehicle and reducing motions that that may result in motion sickness for the viewer of the captured video.

The camera system of the vehicle captures video while the vehicle maneuvers from the current location to the coarse waypoint (act 610). This captured video can be transmitted (e.g., streamed) to a viewing device as the video is captured and/or recorded in a video store for later playback.

Process 600 is repeated for each new coarse waypoint. For example, each time a new user input is received indicating a change in movement of the vehicle 102 (e.g., turn to the right or left, ascend or descend, increase or decrease speed, etc.), the process 600 is performed to identify a coarse waypoint and determine a new trajectory.

It should be noted that the techniques discussed herein can be used in conjunction with additional camera system stabilization techniques. For example, the camera system can be mounted on a mechanical gimbal that uses gyroscopes to stabilize angular rotations of the camera system. However, the techniques discussed herein provide additional stabilization of the captured video by reducing bigger transitional movements of the camera system (e.g., swinging side to side, movement up and down, sudden acceleration, etc.) that the mechanical gimbal does not address.

Although particular functionality is discussed herein with reference to particular modules, components, or systems, it should be noted that the functionality of individual modules, components, or systems discussed herein can be separated into multiple modules, components, or systems, and/or at least some functionality of multiple modules, components, or systems can be combined into a single module, component, or system.

Figure 7:
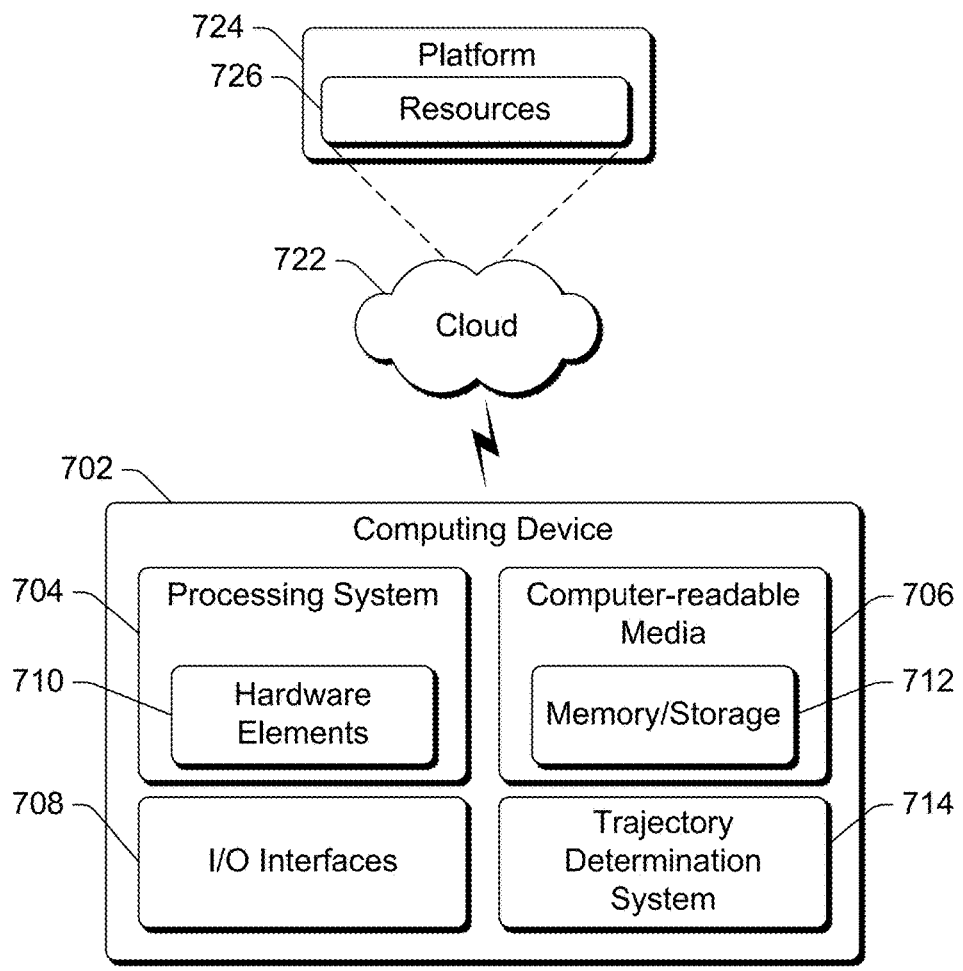
FIG. 7 illustrates an example system that includes an example computing device that is representative of one or more systems and/or devices that may implement the various techniques described herein.

FIG. 7 illustrates an example system generally at 700 that includes an example computing device 702 that is representative of one or more systems and/or devices that may implement the various techniques described herein. The computing device 702 may be, for example, a device associated with a vehicle, an on-chip system, and/or any other suitable computing device or computing system. The computing device 702 can be implemented by or included as part of, for example, the vehicle 102 of FIG. 1 or FIG. 3.

The example computing device 702 as illustrated includes a processing system 704, one or more computer-readable media 706, and one or more I/O Interfaces 708 that are communicatively coupled, one to another. Although not shown, the computing device 702 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 704 is representative of functionality to perform one or more operations using hardware. Accordingly, the processing system 704 is illustrated as including hardware elements 710 that may be configured as processors, functional blocks, and so forth. This may include implementation in hardware as an application specific integrated circuit or other logic device formed using one or more semiconductors. The hardware elements 710 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 706 is illustrated as including memory/storage 712. The memory/storage 712 represents memory/storage capacity associated with one or more computer-readable media. The memory/storage 712 may include volatile media (such as random access memory (RAM)) and/or nonvolatile media (such as read only memory (ROM), Flash memory, optical disks, magnetic disks, and so forth). The memory/storage 712 may include fixed media (e.g., RAM, ROM, a fixed hard drive, and so on) as well as removable media (e.g., Flash memory, a removable hard drive, an optical disc, and so forth). The computer-readable media 706 may be configured in a variety of other ways as further described below.

The one or more input/output interface(s) 708 are representative of functionality to allow a user to enter commands and information to computing device 702, and also allow information to be presented to the user and/or other components or devices using various input/output devices. Examples of input devices include a keyboard, a cursor control device (e.g., a mouse), a microphone (e.g., for voice inputs), a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 702 may be configured in a variety of ways as further described below to support user interaction.

The computing device 702 also includes trajectory determination system 714. The trajectory determination system 714 provides various functionality to determine trajectories that reduce sudden changes in direction of movement of a vehicle, reduce sudden changes in speed of the vehicle, and/or reduce sudden changes in acceleration of the vehicle as discussed above. The trajectory determination system 714 can implement, for example, the trajectory determination system 310 of FIG. 3.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of computing platforms having a variety of processors.

An implementation of the described modules and techniques may be stored on or transmitted across some form of computer-readable media. The computer-readable media may include a variety of media that may be accessed by the computing device 702. By way of example, and not limitation, computer-readable media may include "computer-readable storage media" and "computer-readable signal media."

"Computer-readable storage media" refers to media and/or devices that enable persistent storage of information and/or storage that is tangible, in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of the computing device 702, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, the hardware elements 710 and computer-readable media 706 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules and other program modules may be implemented as one or more instructions and/or logic embodied on some form of computer-readable storage media and/or by one or more hardware elements 710. The computing device 702 may be configured to implement particular instructions and/or functions corresponding to the software and/or hardware modules. Accordingly, implementation of modules as a module that is executable by the computing device 702 as software may be achieved at least partially in hardware, e.g., through use of computer-readable storage media and/or hardware elements 710 of the processing system. The instructions and/or functions may be executable/operable by one or more articles of manufacture (for example, one or more computing devices 702 and/or processing systems 704) to implement techniques, modules, and examples described herein.

The techniques described herein may also be implemented all or in part through use of a distributed system, such as over a "cloud" 722 via a platform 724 as described below. The cloud 722 includes and/or is representative of a platform 724 for resources 726. The platform 724 abstracts underlying functionality of hardware (e.g., servers) and software resources of the cloud 722. The resources 726 may include applications and/or data that can be utilized while computer processing is executed on servers that are remote from the computing device 702. Resources 726 can also include services provided over the Internet and/or through a subscriber network, such as a cellular or Wi-Fi network.

The platform 724 may abstract resources and functions to connect the computing device 702 with other computing devices. The platform 724 may also serve to abstract scaling of resources to provide a corresponding level of scale to encountered demand for the resources 726 that are implemented via the platform 724. Accordingly, in an interconnected device embodiment, implementation of functionality described herein may be distributed throughout the system 700. For example, the functionality may be implemented in part on the computing device 702 as well as via the platform 724 that abstracts the functionality of the cloud 722.

In the discussions herein, various different embodiments are described. It is to be appreciated and understood that each embodiment described herein can be used on its own or in connection with one or more other embodiments described herein. Further aspects of the techniques discussed herein relate to one or more of the following embodiments.

A method comprising: identifying a coarse waypoint for a vehicle; determining a trajectory for the vehicle from a current location of the vehicle to the coarse waypoint, the trajectory reducing sudden changes in direction of movement of the vehicle, reducing sudden changes in speed of the vehicle, and reducing sudden changes in acceleration of the vehicle; selecting one or more fine waypoints along the trajectory; communicating commands to a movement control system to maneuver the vehicle from the current location to the coarse waypoint and passing through each of the one or more fine waypoints; and capturing video via a camera system of the vehicle while the vehicle maneuvers from the current location to the coarse waypoint.

Alternatively or in addition to any of the above described methods, any one or combination of: the vehicle comprising an unmanned aerial vehicle; the captured video being stabilized due to the vehicle maneuvering from the current location to the coarse waypoint through the one or more fine waypoints; the video comprising a first person view of the vehicle; the method further comprising recording the video for later playback; the method further comprising transmitting the video to a viewing device for playback by a user of the viewing device, the viewing device comprising virtual reality or augmented reality glasses, or a virtual reality or augmented reality headset; the method further comprising the trajectory reducing sudden changes in direction of movement of the vehicle by reducing jerk of the vehicle; the method further comprising reducing sudden changes in direction of movement of the vehicle by determining the trajectory by minimizing a third derivative of the trajectory; the method further comprising the trajectory reducing sudden changes in direction of movement of the vehicle by reducing snap of the vehicle; the method further comprising reducing sudden changes in direction of movement of the vehicle by determining the trajectory by minimizing a fourth derivative of the trajectory.

A device comprising: a coarse waypoint determination module configured to identify a coarse waypoint for a vehicle; a trajectory determination module configured to determine a trajectory for the vehicle from a current location of the vehicle to the coarse waypoint, the trajectory reducing sudden changes in direction of movement of the vehicle, reducing sudden changes in speed of the vehicle, and reducing sudden changes in acceleration of the vehicle; a fine waypoint selection module configured to select multiple fine waypoints along the trajectory; a movement control module configured to maneuver the vehicle from the current location to the coarse waypoint by passing through each of the one or more fine waypoints; and a camera system configured to capture video while the vehicle maneuvers from the current location to the coarse waypoint.

Alternatively or in addition to any of the above described devices, any one or combination of: the movement control module being further configured to maneuver the vehicle by providing control signals to one or more motors of the vehicle; the device comprising a drone; the trajectory reducing sudden changes in direction of movement of the vehicle by reducing jerk of the camera system; the trajectory reducing sudden changes in direction of movement of the vehicle by reducing snap of the camera system; the video comprising a first person view of the vehicle, the video being stabilized due to the vehicle maneuvering from the current location to the coarse waypoint by passing through the one or more fine waypoints.

A device comprising: one or more processors; a computer-readable storage medium having stored thereon multiple instructions that, responsive to execution by the one or more processors, cause the one or more processors to perform acts comprising: identifying a coarse waypoint for a vehicle; determining a trajectory for the vehicle from a current location of the vehicle to the coarse waypoint, the trajectory reducing sudden changes in direction of movement of the vehicle, reducing sudden changes in speed of the vehicle, and reducing sudden changes in acceleration of the vehicle; selecting multiple fine waypoints along the trajectory; maneuvering the vehicle from the current location to the coarse waypoint and passing through each of the one or more fine waypoints; capturing video via a camera system of the vehicle while the vehicle maneuvers from the current location to the coarse waypoint.

Alternatively or in addition to any of the above described devices, any one or combination of: the trajectory reducing sudden changes in direction of movement of the vehicle by reducing jerk of the camera system; the trajectory reducing sudden changes in direction of movement of the vehicle by reducing snap of the camera system; the video comprising a first person view of the vehicle, the video being stabilized due to the vehicle maneuvering from the current location to the coarse waypoint passing through the one or more fine waypoints.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method to stabilize vehicle-captured video, the method comprising:

identifying a coarse waypoint for a vehicle;
determining a trajectory for the vehicle from a current location of the vehicle to the coarse waypoint, wherein the trajectory is a polynomial, wherein determining the trajectory comprises:
reducing sudden changes in direction of movement of the vehicle by minimizing a first derivative of the trajectory at a first time and minimizing a second derivative of the trajectory at a second, different, time;
reducing sudden changes in speed of the vehicle; and
reducing sudden changes in acceleration of the vehicle;
selecting one or more fine waypoints along the trajectory;
communicating commands to a movement control system to maneuver the vehicle from the current location to the coarse waypoint and passing through each of the one or more fine waypoints; and
capturing video via a camera system of the vehicle while the vehicle maneuvers from the current location to the coarse waypoint.

2. The method of claim 1, the vehicle comprising an unmanned aerial vehicle.

3. The method of claim 1, the captured video being stabilized due to the vehicle maneuvering from the current location to the coarse waypoint through the one or more fine waypoints.

4. The method of claim 1, the video comprising a first person view of the vehicle.

5. The method of claim 4, further comprising recording the video for later playback.

6. The method of claim 4, further comprising transmitting the video to a viewing device for playback by a user of the viewing device, the viewing device comprising virtual reality or augmented reality glasses, or a virtual reality or augmented reality headset.

7. The method of claim 4, further comprising the trajectory reducing sudden changes in direction of movement of the vehicle by reducing jerk of the vehicle.

8. The method of claim 7, wherein reducing sudden changes in direction of movement of the vehicle comprises minimizing a third derivative of the trajectory.

9. The method of claim 4, further comprising the trajectory reducing sudden changes in direction of movement of the vehicle by reducing snap of the vehicle.

10. The method of claim 9, wherein reducing sudden changes in direction of movement of the vehicle comprises minimizing a fourth derivative of the trajectory.

11. A device comprising:
a coarse waypoint determination module configured to identify a coarse waypoint for a vehicle;
a trajectory determination module configured to determine a trajectory for the vehicle from a current location of the vehicle to the coarse waypoint, wherein the trajectory is a polynomial, wherein to determine the trajectory the trajectory determination module is configured to:
minimize a first derivative of the trajectory to reduce sudden changes in direction of movement of the vehicle at a first time and minimizing a second derivative of the trajectory at a second, different, time;
reduce sudden changes in speed of the vehicle; and
reduce sudden changes in acceleration of the vehicle;
a fine waypoint selection module configured to select multiple fine waypoints along the trajectory;

a movement control module configured to maneuver the vehicle from the current location to the coarse waypoint by passing through each of the one or more fine waypoints; and a camera system configured to capture video while the vehicle maneuvers from the current location to the coarse waypoint.

12. The device of claim 11, the movement control module being further configured to maneuver the vehicle by providing control signals to one or more motors of the vehicle.

13. The device of claim 11, the device comprising a drone.

14. The device of claim 11, the trajectory reducing sudden changes in direction of movement of the vehicle by reducing jerk of the camera system.

15. The device of claim 11, the trajectory reducing sudden changes in direction of movement of the vehicle by reducing snap of the camera system.

16. The device of claim 11, the video comprising a first person view of the vehicle, the video being stabilized due to the vehicle maneuvering from the current location to the coarse waypoint by passing through the one or more fine waypoints.

17. A device comprising:
one or more processors;
a computer-readable storage medium having stored thereon multiple instructions that, responsive to execution by the one or more processors, cause the one or more processors to perform acts comprising:
identifying a coarse waypoint for a vehicle;
determining a trajectory for the vehicle from a current location of the vehicle to the coarse waypoint, wherein the trajectory is a polynomial, by:
reducing sudden changes in direction of movement of the vehicle by minimizing a first derivative of the trajectory at a first time and minimizing a second derivative of the trajectory at a second, different, time;
reducing sudden changes in speed of the vehicle; and
reducing sudden changes in acceleration of the vehicle;
selecting multiple fine waypoints along the trajectory;
maneuvering the vehicle from the current location to the coarse waypoint and passing through each of the one or more fine waypoints; and
capturing video via a camera system of the vehicle while the vehicle maneuvers from the current location to the coarse waypoint.

18. The device of claim 17, the trajectory reducing sudden changes in direction of movement of the vehicle by reducing jerk of the camera system.

19. The device of claim 17, the trajectory reducing sudden changes in direction of movement of the vehicle by reducing snap of the camera system.

20. The device of claim 17, the video comprising a first person view of the vehicle, the video being stabilized due to the vehicle maneuvering from the current location to the coarse waypoint passing through the one or more fine waypoints.

* * * * *